US010956741B2

United States Patent
Masci

(10) Patent No.: US 10,956,741 B2
(45) Date of Patent: Mar. 23, 2021

(54) SYSTEM FOR AUTOMATIC MONITORING OF BIRDS AND RELATED METHOD OF USE

(71) Applicant: The Edge Company S.R.L., Rimini (IT)

(72) Inventor: Fabio Masci, Rimini (IT)

(73) Assignee: The Edge Company S.R.L., Rimini (IT)

( * ) Notice: Subject to any disclaimer, the term of this patent is extended or adjusted under 35 U.S.C. 154(b) by 13 days.

(21) Appl. No.: 16/347,098

(22) PCT Filed: Nov. 28, 2017

(86) PCT No.: PCT/IT2017/000270
§ 371 (c)(1),
(2) Date: May 2, 2019

(87) PCT Pub. No.: WO2018/100594
PCT Pub. Date: Jun. 7, 2018

(65) Prior Publication Data
US 2019/0272429 A1      Sep. 5, 2019

(30) Foreign Application Priority Data
Nov. 29, 2016   (IT) .......................... 102016000120787

(51) Int. Cl.
*G06K 9/00*      (2006.01)
*G06N 3/08*      (2006.01)

(52) U.S. Cl.
CPC ..... *G06K 9/00671* (2013.01); *G06K 9/00771* (2013.01); *G06N 3/08* (2013.01)

(58) Field of Classification Search
CPC ... G06N 3/08; G06K 9/00671; G06K 9/00771
See application file for complete search history.

(56) References Cited

U.S. PATENT DOCUMENTS

| 2014/0313345 A1 | 10/2014 | Conard et al. |
| 2016/0063310 A1* | 3/2016 | Okamoto ........... G06K 9/00362 348/143 |

FOREIGN PATENT DOCUMENTS

| CA | 2947138 A1 | 11/2015 |
| RU | 2426310 C1 | 8/2011 |
| RU | 2014143127 A | 5/2016 |

OTHER PUBLICATIONS

Jun Zhang et al., Hierarchical incorporation of shape and shape dynamics for flying bird detection, May 5, 2014, Neurocomputing, vol. 131, p. 179-190. (Year: 2014).*
International Search Report and Written Opinion dated May 14, 2018 for counterpart PCT Application No. PCT/IT2017/000270.
Russian Office Action dated Feb. 2, 2020 for Russian Patent Application No. 2019113910.

(Continued)

*Primary Examiner* — Brenda C Bernardi
(74) *Attorney, Agent, or Firm* — Shuttleworth & Ingersoll, PLC; Timothy Klima

(57) ABSTRACT

An automatic monitoring system and a method for automatically monitoring the presence of any birds in a space or area using artificial vision techniques. That system and method also allow automatic detection of the species to which such birds belong, their movements, for example the flight trajectories, relative to the observation space or area, as well as the number of such birds.

23 Claims, 4 Drawing Sheets

(56) References Cited

OTHER PUBLICATIONS

Zhang Jun et al: "Hierarchical incorporation of shape and shape dynamics for flying bird detection" Neurocomputing, vol. 131, Nov. 11, 2013, pp. 179-190.
European Office Action dated Jan. 27, 2021 from counterpart European Patent Application No. 17838165.3.

* cited by examiner

SYSTEM FOR AUTOMATIC MONITORING OF BIRDS AND RELATED METHOD OF USE This application is the National Phase of International Application PCT/IT2017/000270 filed Nov. 28, 2017 which designated the U.S.

This application claims priority to Italian Patent Application No. 102016000120787 filed Nov. 29, 2016, which application is incorporated by reference herein.

TECHNICAL FIELD

This invention relates to an automatic monitoring system and a method for automatically monitoring the presence or absence of birds in a space or area using artificial vision techniques. That system and method also allow automatic detection of the species to which such birds belong, their movements, for example the flight trajectories, relative to the observation space or area, as well as the number of such birds.

A system according to this invention may be applied in the field of flight safety for monitoring avifauna around airports, but also in other fields, such as agriculture, observation in protected nature areas, dumps and/or in urban areas particularly exposed to the presence of birds, or in the context of projects for the re-population of birds belonging to one or more species.

The expression monitoring the presence or absence of birds in an observation space or area means an activity that comprises observation of such observation space or area and at least detection of the presence or the absence of one or more birds in such observation space or area, as a consequence of that observation.

BACKGROUND ART

At present, the presence or absence of birds in an observation space or area is monitored by means of methods involving observation of the space by personnel equipped with sight systems such as telescopes or binoculars and/or the use of radar systems. These methods do not allow full automation of the detection of the presence of the birds in the observation space or area.

In particular, the observation performed by the personnel in the field is highly subjective, and affected by parameters such as the training and level of knowledge of the personnel.

Moreover, the prior art methods for monitoring the presence or absence of birds in an observation space or area do not allow good precision to be achieved in the observation of a large observation space or area and with acceptable precision in the whole of the observation space or area, except with unsustainable costs, due for example to the need for the presence of personnel consisting of many operators tasked with observation or personnel including highly specialised operators.

At present there are also radar system for detecting birds.

Such radar systems must be operated by highly specialised personnel able to interpret the information and maintain them. The costs for buying and maintaining such radar systems are very high.

DISCLOSURE OF THE INVENTION

The aim of this description is to make available an automatic system for monitoring the presence or absence of birds in an observation space or area, which allows the bird monitoring activity to be fully automated.

Another aim of this description is to provide an automatic system for monitoring the presence or absence of birds in an observation space or area, that can carry out the monitoring in a large space or area and with excellent observation precision in the whole observation space or area, with costs that are more sustainable than those of prior art systems.

A further aim of this description is to provide a method for automatically monitoring the presence or absence of birds in an observation space or area, which can be used to achieve the above-mentioned aims with reference to the monitoring system.

These aims are fulfilled by a monitoring system or a monitoring method, in accordance with this description, as described in any combination of one or more of the claims appended to this application.

In this application, the expression observation space means a space or area in which one intends to monitor the presence or absence of one or more birds.

It should also be noticed that an image may be considered as comprising multiple portions of the self-same image.

In this application, when reference is made to a feature vector correlated with an image, this means a feature vector that, for each portion of the image, comprises at least one feature representing the value of at least one physical quantity in the corresponding portion.

That physical quantity may, for example, be the intensity of incident light on an image sensor, which for example is part of a video camera or a camera, if necessary filtered in a specific frequency band, or any other visual characteristic.

The feature vector is an n-dimensional vector of numeric values (approximately 1000-1500) that represent the image or the portion of image captured.

According to one advantageous embodiment of this invention, the feature vectors are used for statistical processing by means of latest-generation neural networks in the processing unit.

A neural network is a mathematical/computerised calculation model based on the biological neural networks. In practical terms, neural networks are non-linear statistical data structures organised as modelling tools. They can be used for simulating complex relationships between inputs and outputs that other analytical functions are unable to represent. An artificial neural network receives external signals on a layer of input nodes (processing units), each connected to many internal nodes, which are organised on multiple levels. Each node processes the signals received and transmits the result to subsequent nodes.

Advantageously, the statistical processing is associated with an ontology, which allows definition of basic classification criteria, even upstream of the whole processing process.

In computer science, the term ontology describes the way in which various schemes are combined in a data structure containing all of the important entities and their relationships in a domain. Computer programs can use the ontology for a variety of purposes, including inductive reasoning, classification, and various problem solving techniques.

In this application, when reference is made to a reference vector correlated with an image, it means a data vector that, for each portion of the image, comprises at least one value of a descriptor in the corresponding portion.

The descriptor may be a shape and/or colour and/or texture descriptor and/or any other type of descriptor.

The reference vector correlated with an image may be calculated, for example by means of a processing unit, starting with the feature vector correlated with the same image.

According to a first aspect of this description, it relates to an automatic monitoring system. The monitoring system according to the first aspect is designed to automatically detect the presence of at least one bird in an observation space or the presence of a plurality of birds in the observation space.

According to a second aspect, this description relates to an automatic dispersal system.

The dispersal system according to the second aspect comprises:
a monitoring system according to the first aspect;
a bird dispersal unit.

The dispersal system according to the second aspect of this description is designed to automatically disperse and/or drive away the at least one bird or the plurality of birds which are automatically detected by the monitoring system according to the first aspect of this description, from the observation space.

A monitoring system according to the first aspect of this description may, in any case, be used independently of a dispersal system according to the second aspect of this description, and therefore in other contexts and/or for other purposes.

The monitoring system according to the first aspect of this description comprises an image acquisition unit.

The monitoring system according to the first aspect of this description comprises a processing unit.

The acquisition unit is designed to capture images of the observation space. For that purpose, the acquisition unit comprises at least one acquisition device. The acquisition device defines at least one field of view for capturing the images.

The monitoring system may comprise one or more acquisition devices.

A monitoring system according to the first aspect of this description may be made, for example, according to a first variant or a second variant of the self-same monitoring system.

In a first variant of the monitoring system according to the first aspect of this description, the acquisition unit comprises a first acquisition device.

In a second variant of the monitoring system according to the first aspect of this description, the acquisition unit comprises a first acquisition device and a second acquisition device.

The dispersal system according to the second aspect of this description preferably comprises a second interface or communication system.

The second interface or communication system is operatively interposed between the processing unit and the dispersal unit. The second interface system is preferably designed to allow the exchange of the one or more command signals between the processing unit and the dispersal unit.

The acquisition unit is designed to capture, in respective detecting instants, at least one sequence of respective detecting images of said observation space.

Both in the first variant and in the second variant of the monitoring system according to the first aspect of this description, the acquisition unit is designed to capture the detecting images by means of the above-mentioned first acquisition device.

The processing unit is programmed to process at least one respective detecting image captured by the acquisition unit, in such a way as to obtain at least one respective detecting data item.

The processing unit is preferably programmed to process at least one respective feature vector correlated with the respective detecting image, in such a way as to obtain the respective detecting data item.

In order to obtain the respective detecting data item, the processing unit is preferably programmed to calculate at least one respective reference vector correlated with the respective detecting image.

In order to obtain the respective detecting data item, the processing unit is preferably programmed to compare the respective reference vector correlated with the respective detecting image with at least one comparison reference vector.

A database is created of the species of birds corresponding to the reference feature vectors, which are then compared with the feature vectors relating to the images captured. In particular, the reference feature vectors are used for training statistical classifiers that will be applied to the feature vectors relating to the images captured.

The acquisition unit is preferably designed to capture, in respective tracking instants after said detecting instants, at least one sequence of respective images of the bird detected or of the plurality of birds detected.

These images of the bird detected or of the plurality of birds detected may be called "tracking images", for reasons described in more detail below, and in order to distinguish them from the above-mentioned detecting images.

In the first variant of the monitoring system according to the first aspect of this description, the acquisition unit is designed to capture the tracking images by means of the first acquisition device.

In the second variant of the monitoring system according to the first aspect of this description, the acquisition unit is designed to capture the tracking images by means of the second acquisition device.

The processing unit is preferably programmed for processing at least one respective tracking image, in such a way as to derive at least one respective kinematic data item associated with the bird detected.

The processing unit is preferably programmed for processing at least one respective feature vector correlated with the respective tracking image, in such a way as to derive the respective kinematic data item.

The processing unit is preferably programmed for processing the respective tracking image, in such a way as to derive at least one respective recognition data item associated with the bird detected.

The respective recognition data item indicates, in the respective tracking instant to which the respective tracking image refers, the species to which the bird detected belongs.

The processing unit is preferably programmed for processing the respective tracking image, in such a way as to derive, if the detecting data item indicates the presence of a plurality of birds in the observation space, at least one respective concentration data item. The concentration data item indicates the number of birds of the plurality of birds detected.

The processing unit is preferably programmed for processing at least one respective feature vector correlated with the respective tracking image, in such a way as to derive the respective recognition data item and/or the respective concentration data item.

In order to derive the respective recognition data item and/or the respective concentration data item, the processing unit is preferably programmed for calculating at least one respective reference vector correlated with the respective tracking image.

In order to derive the respective recognition data item and/or the respective concentration data item, the processing unit is preferably programmed for comparing the respective reference vector correlated with the respective tracking image with a reference vector correlated with a previous tracking image captured before the respective tracking image.

In order to derive the respective recognition data item and/or the respective concentration data item, the processing unit is preferably programmed for comparing the respective reference vector correlated with the respective tracking image with a plurality of reference vectors correlated with respective previous tracking images captured before the respective tracking image.

In order to derive the respective recognition data item and/or the respective concentration data item, the processing unit is preferably programmed for comparing the respective reference vector correlated with the respective tracking image with information data stored or pre-set in the processing unit. The information data relates to physical features and/or to typical movements of a plurality of species of birds. The information data may, for example, relate to typical shapes and/or sizes and/or frequencies of wing beat and/or colours of the plurality of species.

The processing unit could be programmed for processing the respective tracking image, in such a way as to derive at least one respective plurality of recognition data, each of which is associated with a corresponding bird detected of the plurality of birds detected.

The processing unit is preferably programmed for controlling the acquisition unit as a function at least of said respective kinematic data item and/or as a function at least of said respective recognition data item and/or as a function at least of said respective concentration data item and/or as a function of said plurality of kinematic data and/or as a function of said plurality of recognition data, in such a way that the tracking images captured by the acquisition unit, after said respective tracking instant, are captured tracking the movement of said bird detected relative to the observation space or the movements of the plurality of birds detected relative to the observation space.

The processing unit is preferably programmed for controlling the movement system of the acquisition unit as a function at least of said respective kinematic data item and/or as a function at least of said respective recognition data item and/or as a function at least of said respective concentration data item and/or as a function of said plurality of kinematic data and/or as a function of said plurality of recognition data, in such a way that by means of the movement relative to the observation space of at least one acquisition device of the acquisition unit, and therefore by means of the movement relative to the observation space of the field of view of the at least one acquisition device, the tracking images captured by the acquisition unit, after said respective tracking instant, are captured tracking the movement of said bird detected relative to the observation space or the movements of the plurality of birds detected relative to the observation space.

The processing unit is preferably programmed for controlling the bird dispersal unit as a function at least of said respective kinematic data item and/or as a function at least of said respective recognition data item and/or as a function at least of said respective concentration data item and/or as a function of said plurality of kinematic data and/or as a function of said plurality of recognition data, in such a way that said dispersal unit can disperse and/or drive away at least said bird detected and/or said plurality of birds detected from said observation space, based at least on said respective kinematic data item and/or based at least on said respective recognition data item and/or based at least on said respective concentration data item and/or based at least on said plurality of kinematic data and/or based at least on said plurality of recognition data.

The processing unit is preferably programmed for switching the acquisition unit in such a way that, if said respective detecting data item indicates the presence of at least one bird in the observation space, or if said respective detecting data item indicates the presence of a plurality of birds in the observation space, said acquisition unit changes from the acquisition of said detecting images to the acquisition of said tracking images.

In this case, the processing unit is programmed for switching the acquisition unit after each of the detecting instants, if the respective detecting data item indicates the presence of at least one bird in the observation space, or if the respective detecting data item indicates the presence of a plurality of birds in the observation space.

According to a third aspect of this description, this description relates to a monitoring method. By means of the monitoring method according to the third aspect of this description, it is possible to automatically detect the presence of at least one bird in an observation space or of a plurality of birds in an observation space.

The monitoring method according to the third aspect of this description may, for example, be performed by means of a monitoring system according to the first aspect of this description.

According to a fourth aspect of this description, this description relates to a dispersal method.

The dispersal method according to the fourth aspect of this description comprises:
 a monitoring method according to the third aspect of this description;
 an automatic step of dispersal and/or driving away of at least one bird or of a plurality of birds, which were automatically detected during the monitoring method according to the third aspect of this description, from the observation space.

By means of the dispersal method according to the fourth aspect of this description, it is possible to automatically drive away and/or disperse the at least one bird or the plurality of birds which, which were detected by means of the monitoring method according to the third aspect of this description, from the observation space.

The dispersal method according to the fourth aspect of this description may, for example, be performed by means of a dispersal system according to the second aspect of this description.

A monitoring method according to the third aspect of this description may, in any case, be used or applied independently of a dispersal method according to the fourth aspect of this description and/or of a dispersal system according to the second aspect of this description, and therefore in other contexts and/or for other purposes.

The monitoring method according to the third aspect of this description comprises an operational detecting phase.

The monitoring method according to the third aspect of this description preferably comprises an operational tracking phase.

The operational tracking phase, for each tracking instant, comprises a respective operational tracking sequence.

Each respective operational tracking sequence comprises a respective tracking step.

Each respective operational tracking sequence comprises a respective processing step.

Each respective operational tracking sequence preferably comprises a respective deriving step.

The deriving step is performed as a function of and/or depending on the respective processing step.

During the deriving step, the processing unit derives at least one respective kinematic data item and/or at least one respective recognition data item and/or at least one respective concentration data item.

The monitoring method according to the third aspect of this description preferably comprises an operational switching phase.

The dispersal method according to the fourth aspect of this description allows automatic dispersal and/or driving away of the bird detected or the plurality of birds detected from said observation space.

Even the dispersal method according to the fourth aspect of this description therefore comprises the above-mentioned operational detecting phase and operational tracking phase.

Even the dispersal method according to the fourth aspect of this description therefore comprises the operational intermediate switching phase.

BRIEF DESCRIPTION OF THE DRAWINGS

The characteristics of a monitoring system and of a monitoring method according to this description are more apparent in the detailed description that follows relative to a possible embodiment of a monitoring system according to the first aspect of this description and to a possible embodiment of a monitoring method according to the third aspect of this description. The detailed description that follows is provided by way of example and does not limit the more general concepts claimed.

However, it should be noticed that a monitoring system according to the first aspect of this description and a monitoring method according to the third aspect of this description may be used and/or applied in other contexts different to their use in a dispersal system or in a dispersal method, and therefore for different purposes to those of a dispersal system or a dispersal method.

Figure 1:
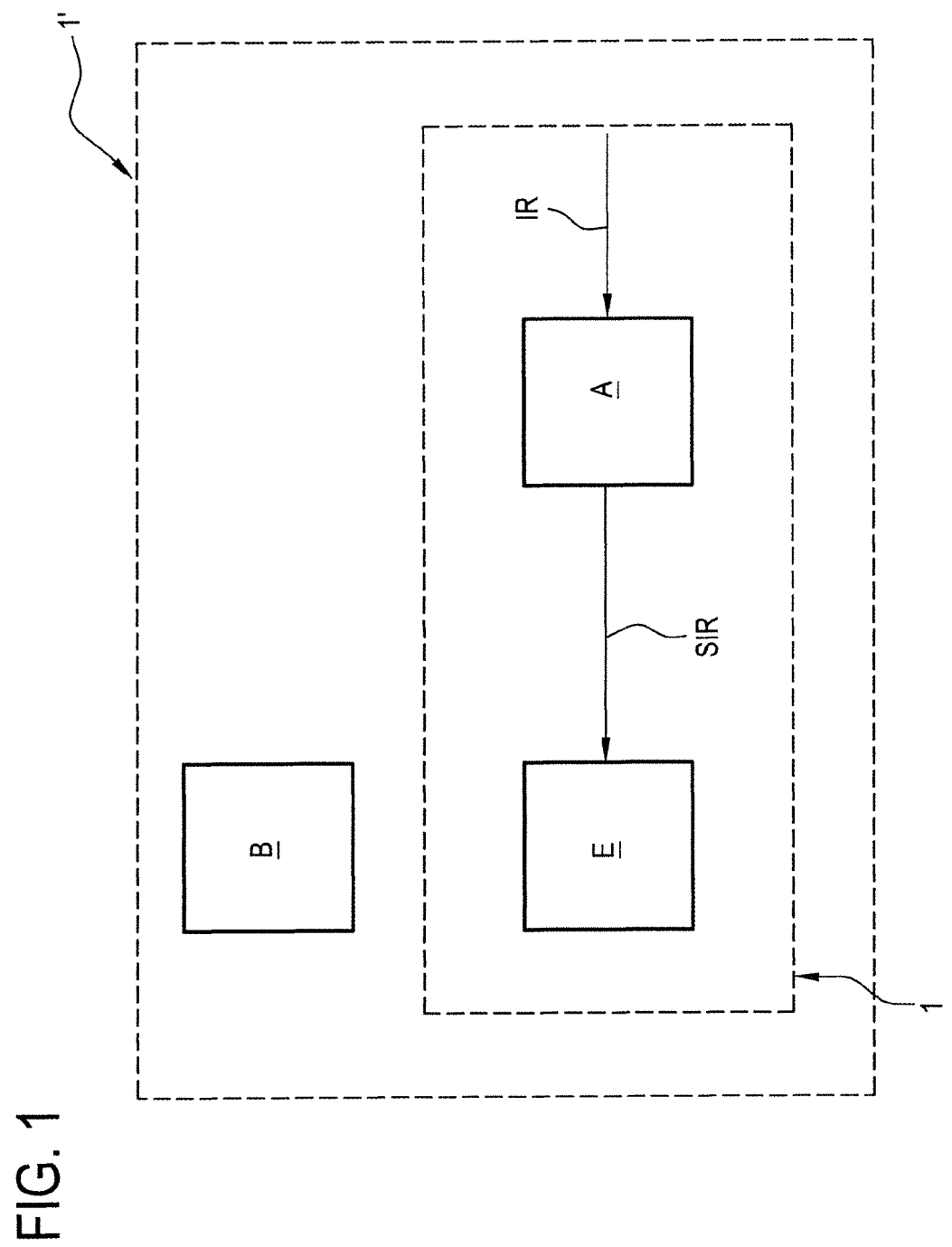
Figure 2:
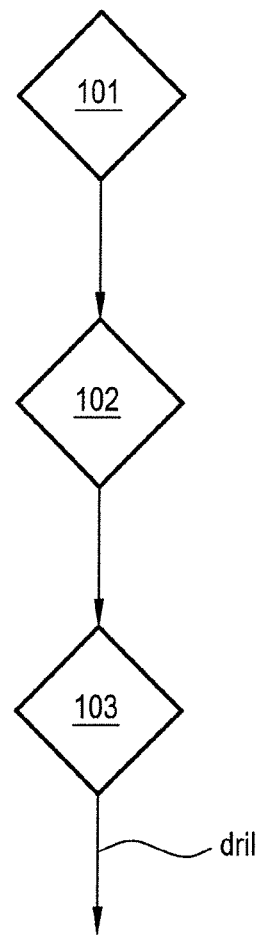
Figure 3:
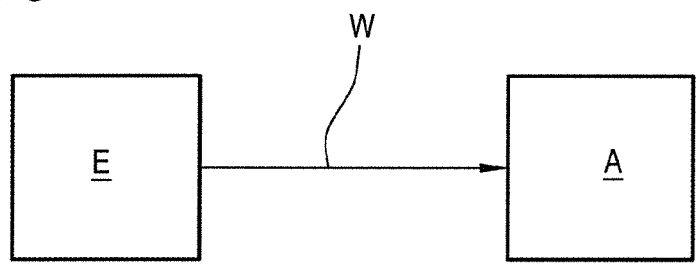
Figure 4:
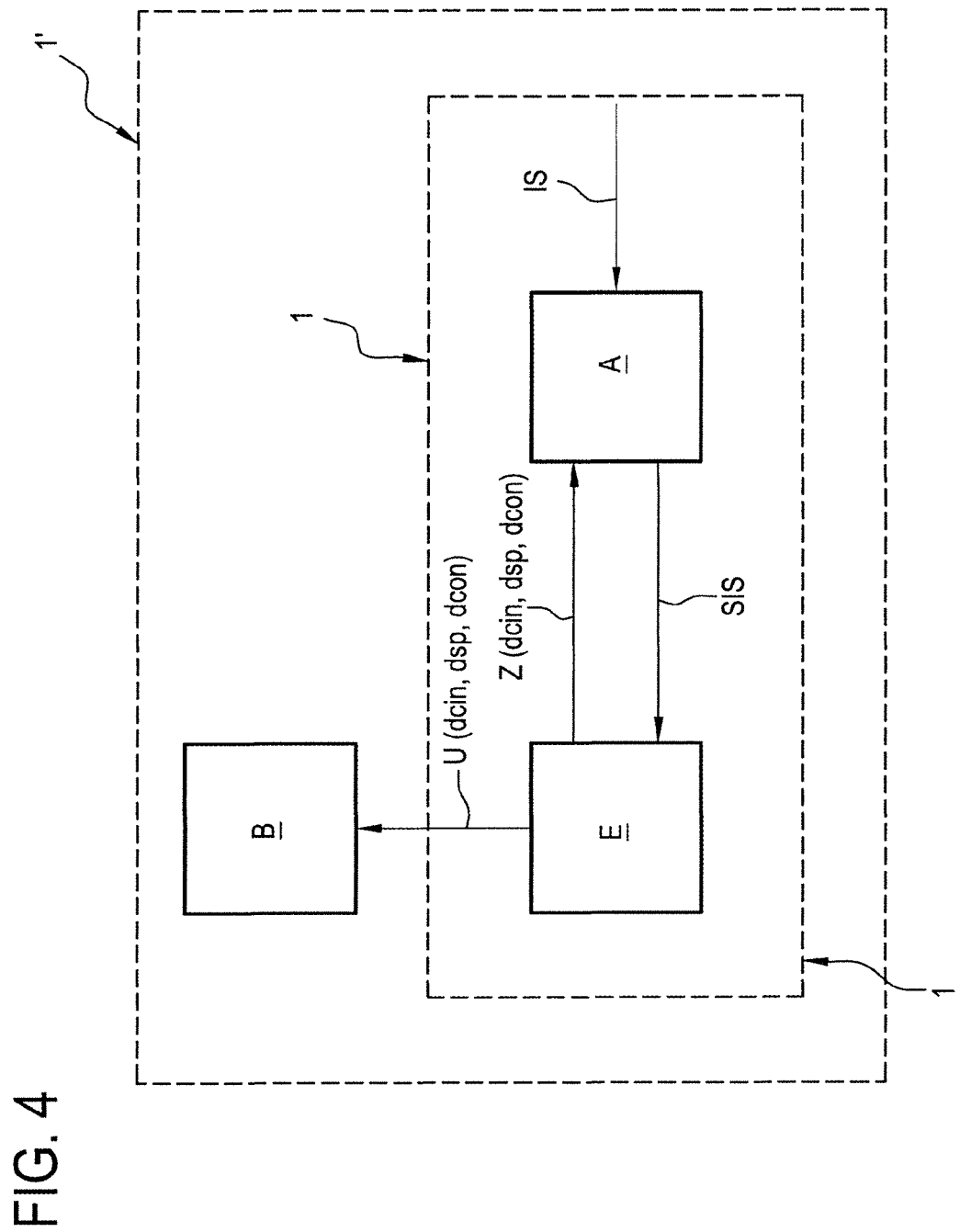
Figure 5:
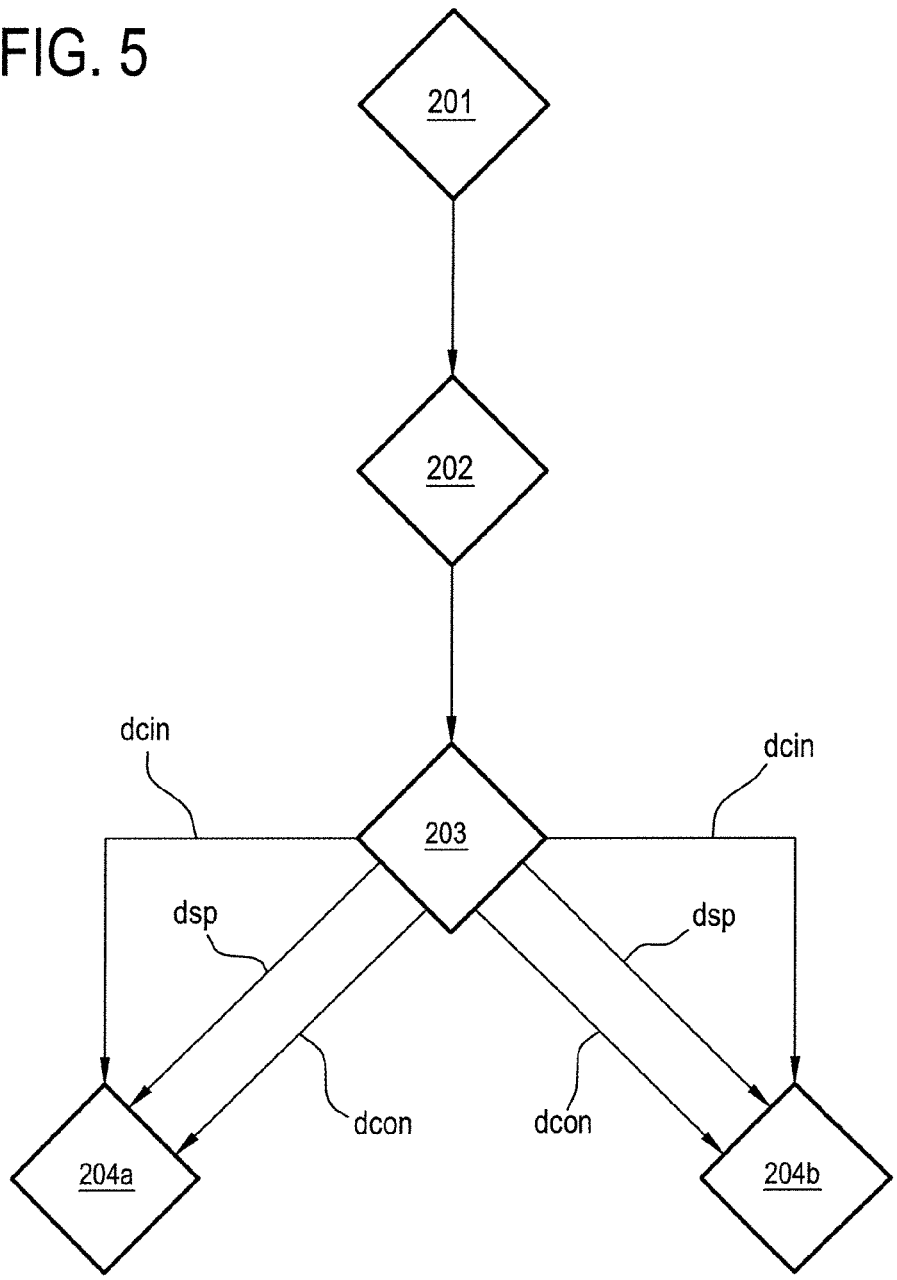

The detailed description that follows relates to the accompanying drawings, in which:

FIG. 1 is a block diagram relating to an operational detecting phase of a possible embodiment of a monitoring method according to the third aspect of this description and implemented by means of a monitoring system according to the first aspect of this description;

FIG. 2 is a flow chart relating to an operational detecting sequence that is part of the operational detecting phase of FIG. 1;

FIG. 3 is a block diagram relating to an operational switching phase of the possible embodiment of a monitoring method according to the second aspect of this description;

FIG. 4 is a block diagram relating to an operational tracking phase of the possible embodiment of a monitoring method according to the second aspect of this description;

FIG. 5 is a flow chart relating to an operational tracking sequence that is part of the operational tracking phase of FIG. 4.

DETAILED DESCRIPTION OF PREFERRED EMBODIMENT OF THE INVENTION

In FIGS. 1 and 4, the numeral 1 denotes a box drawn with a dashed line containing a block diagram of a possible embodiment of a monitoring system according to the first aspect of this description. The monitoring system 1 is designed to automatically detect the presence of at least one bird in an observation space or the presence of a plurality of birds in the observation space.

In FIGS. 1 and 4, the numeral 1' denotes a box drawn with a dashed line containing a block diagram of a possible embodiment of a dispersal system according to the fourth aspect of this description.

The dispersal system 1' comprises:
the monitoring system 1;
a bird dispersal unit, represented by the block B.

The dispersal system 1' is designed to automatically disperse and/or drive away the at least one bird or the plurality of birds which are automatically detected by the monitoring system 1, from the observation space.

However, it should be noticed that this description relates to the monitoring system 1 irrespective of whether or not it is used in the dispersal system 1'.

The monitoring system 1 comprises an image acquisition unit, represented by the block A.

The monitoring system 1 comprises a processing unit, represented by the block E.

The acquisition unit A is designed to capture images of said observation space. For that purpose, the acquisition unit A comprises at least one acquisition device. The acquisition device defines at least one field of view for capturing the images.

An image may be considered indicated by the arrow IR of FIG. 1 or by the arrow IS of FIG. 4.

In a first variant of the monitoring system 1, the acquisition unit A comprises a first acquisition device.

In a second variant of the monitoring system 1, the acquisition unit A comprises a first acquisition device and a second acquisition device.

At least one of the first acquisition device and/or the second acquisition device could be, for example, a camera or a video camera.

The camera or video camera could be, for example, a PTZ (pan-tilt-zoom) camera.

The camera or video camera may, for example, comprise CMOS (Complementary Metal-Oxide-Semiconductor) sensors or CCD sensors or infrared array sensors.

At least one of the first acquisition device and/or the second acquisition device could, for example, comprise infrared or laser sensors for detecting the distance to objects in the frame.

The camera or video camera could, for example, use stereoscopic technology for detecting the distance to the objects in the frame.

The processing unit E is programmed for processing one or more images captured by the acquisition unit A.

The processing unit E is programmed for processing one or more feature vectors correlated with the one or more images captured by the acquisition unit A.

A feature vector represents the features of an image in numeric format. The expression feature vector correlated with an image therefore means an n-dimensional vector of numeric values (approximately 1000-1500) that represent the image or the portion of image captured.

In one advantageous embodiment of this invention, the feature vectors are used for statistical processing by means of latest-generation neural networks in the processing unit.

Advantageously, the statistical processing is associated with an ontology, which allows definition of basic classification criteria, even upstream of the whole processing process.

The acquisition unit A is designed to send, to the processing unit E, one or more feature vectors which are correlated with the one or more images.

The processing unit E is designed to receive the one or more feature vectors.

A feature vector may be considered indicated by the arrow SIR of FIG. 1 or by the arrow SIS of FIG. 4.

The processing unit E is programmed for obtaining and deriving or calculating one or more data items, based on and/or as a function of and/or depending on the processing steps (for detecting or tracking) carried out by the processing unit E.

The monitoring system 1 comprises a first interface or communication system, not illustrated in the accompanying figures. The first interface or communication system is operatively interposed between the processing unit E and the acquisition unit A.

The first interface or communication system is designed to allow the exchange, between the processing unit E and the acquisition unit A, of the one or more feature vectors SIR or SIS.

The processing unit E is programmed for switching the acquisition unit A.

The processing unit E is designed for sending, to the acquisition unit A, at least one switching signal.

The acquisition unit A is designed for receiving the at least one switching signal.

A switching signal may be considered indicated by the arrow W of FIG. 3.

The first interface or communication system is designed to allow the exchange, between the processing unit E and the acquisition unit A, of the at least one switching signal W.

The processing unit E is programmed for controlling the acquisition unit A.

The processing unit E is designed for sending, to the acquisition unit A, one or more control signals.

The acquisition unit A is designed for receiving the one or more control signals.

A control signal may be considered indicated by the arrow Z of FIG. 4.

The first interface or communication system is designed to allow the exchange, between the processing unit E and the acquisition unit A, of the one or more control signals Z.

The acquisition unit A comprises at least one movement system designed for causing a movement of at least one acquisition device of the acquisition unit A, relative to the observation space. That movement is suitable for in turn causing a corresponding movement, relative to the observation space, of at least one field of view defined by the at least one acquisition device, and therefore a corresponding variation of the field of view of the images captured by the at least one acquisition device.

The at least one acquisition device is therefore associated with the movement system.

The at least one acquisition device associated with the movement system, in the first variant of the monitoring system according to the first aspect of this description, is the first acquisition device.

The at least one acquisition device associated with the movement system, in the second variant of the monitoring system according to the first aspect of this description, is the second acquisition device.

The processing unit E is programmed for controlling the movement system, for causing the movement of the at least one acquisition device associated with the self-same movement system.

The processing unit E is designed for sending, to the movement system, the one or more control signals Z.

The movement system is designed for receiving the one or more control signals Z.

The first interface or communication system is designed to allow the exchange, between the processing unit E and the movement system, of the one or more control signals Z.

The processing unit E may be programmed for controlling the bird dispersal unit B.

The processing unit E may be programmed for sending, to the bird dispersal unit B, one or more command signals.

The bird dispersal unit B is designed for receiving the one or more command signals.

A command signal may be considered indicated by the arrow U of FIG. 4.

The dispersal system 1' comprises a second interface or communication system, not illustrated in the accompanying figures.

The second interface or communication system is operatively interposed between the processing unit E and the dispersal unit B. The second interface system is designed to allow the exchange, between the processing unit E and the dispersal unit B, of the one or more command signals U.

One possible embodiment of a monitoring method according to the third aspect of this description comprises:
an operational detecting phase, as in FIG. 1;
an operational switching phase, as in FIG. 3;
an operational tracking phase, as in FIG. 4.

The operational detecting phase occurs in a first time interval comprising a series of detecting instants situated one after the other in time.

The detecting instants may be distant from each other in time.

Therefore, an image of the observation space is detected at different moments for a predetermined time interval.

The operational detecting phase, for each detecting instant, comprises a respective operational detecting sequence. Each respective operational detecting sequence may be considered associated with a respective detecting instant.

Preferably, the detecting in a precise instant is linked to a predetermined sequence of steps.

FIG. 1 shows the monitoring system 1 during a respective operational detecting sequence associated with a respective detecting instant.

FIG. 2 is a flow chart describing a respective operational detecting sequence associated with a respective detecting instant.

Each respective operational detecting sequence comprises a respective image capturing step.

The respective image capturing step is indicated by block 101 in FIG. 2. In the respective image capturing step 101 of the respective operational detecting sequence, an acquisition unit A captures at least one respective detecting image of the observation space. A respective detecting image captured by the acquisition unit A during a respective image capturing step is indicated by the arrow IR of FIG. 1.

Whether the monitoring method according to the third aspect of this description is implemented using the first variant of the monitoring system according to the first aspect of this description, or using the second variant of the monitoring system according to the first aspect of this description, the respective image capturing step is performed using the above-mentioned first acquisition device.

Each respective operational detecting sequence comprises a respective processing step. The processing step is indicated by block 102 in FIG. 2. In the respective processing step 102, the processing unit E processes the respective detecting image IR captured by the acquisition unit A.

In the respective processing step 102, the processing unit E processes at least one respective feature vector correlated with the respective detecting image. The respective feature vector correlated with the respective detecting image is indicated by the arrow SIR in FIG. 1.

Each respective operational detecting sequence comprises, before the respective processing step 102, a respective sending step in which the acquisition unit A sends, to the processing unit E, the respective feature vector SIR correlated with the respective detecting image IR.

Each respective operational detecting sequence comprises, before the respective processing step 102, a receiving step in which the processing unit E receives, from the acquisition unit A, the respective feature vector SIR correlated with the respective detecting image IR.

From the image capturing step a feature vector is obtained which corresponds to the image or to the portion of image captured and the feature vector is sent to and received by the processing unit E.

The feature vector is then further processed by the processing unit.

Each respective operational detecting sequence comprises a respective obtaining step. The respective obtaining step is indicated by block "103" in FIG. 2. In the respective obtaining step 103, the processing unit 102 obtains at least one respective detecting data item. The respective obtaining step 103 is performed as a function of and/or depending on the respective processing step 102.

The respective detecting data item indicates or represents:
the presence, in a respective detecting instant to which the respective detecting image relates, of at least one bird situated in said observation space;
or the absence, in said respective detecting instant, of any birds in said observation space.

The respective detecting data item may therefore either indicate that in the respective detecting instant, to which the respective detecting image relates, there is at least one bird present in the observation space, or there are no birds present in the observation space.

The respective detecting data item could also indicate or represent:
the presence, in the respective detecting instant to which the respective detecting image relates, of at least one plurality of birds situated in said observation space;
or the absence, in said detecting instant, of any plurality of birds in said observation space.

The respective detecting data item may therefore either indicate that in the respective detecting instant, to which the respective detecting image relates, there is at least one plurality of birds present in the observation space, or there are no pluralities of birds present in the observation space.

Hereinafter, the expression "bird detected" means at least one bird present in the observation space, whose presence is detected by obtaining the at least one respective detecting data item.

Hereinafter, the expression "plurality of birds detected" means at least one plurality of birds present in the observation space, whose presence is detected by obtaining the at least one respective detecting data item.

In FIG. 2, the respective detecting data item is represented by the arrow labelled "dril", and comes out of the block relating to the respective obtaining step 103.

The detecting data item "dril" is preferably a Boolean type data item (true/false) indicating the presence or the absence of at least one bird in the observation space.

That data item is obtained by processing of the feature vector corresponding to the image captured.

The respective processing step 102 comprises at least one respective calculating step. In the respective calculating step, the processing unit E calculates at least one respective reference vector correlated with the respective detecting image IR.

The expression reference vector correlated with the respective detecting image means a data vector, or an n-dimensional vector of numeric values, that, for each portion of the image, comprises at least one value of a descriptor (for example, a shape and/or colour and/or texture descriptor) in the corresponding portion representing a reference image of the observation space corresponding to the detecting image.

In other words, starting from the image captured and the corresponding feature vector, the processing unit calculates a corresponding reference feature vector.

The respective processing step 102 comprises at least one respective comparing step. In the respective comparing step, the processing unit E compares the respective reference vector correlated with the respective detecting image IR with a comparison reference vector.

At this point it should be noticed that the respective detecting image shows at least one part of the observation space in the respective detecting instant. That part of the observation space therefore falls within the respective field of view defined by the respective detecting image in the respective detecting instant.

The comparison reference vector is a reference vector which is pre-set and stored in the processing unit. The comparison reference vector is a reference vector correlated with a pre-set image. The pre-set image could show at least one bird or one plurality of birds in the same part of the observation space which falls within the field of view of the respective detecting image. The pre-set image could show a flock of birds that falls within the field of view of the respective detecting image.

In the respective comparing step, the processing unit could compare the respective reference vector correlated with the respective detecting image with a plurality of comparison reference vectors.

The plurality of comparison reference vectors is a plurality of reference vectors which is pre-set and stored in the processing unit. The pre-set reference vectors are respective reference vectors correlated with respective pre-set images. Each of the pre-set mages could show at least one respective bird or one respective plurality of birds in the same part of the observation space which falls within the field of view of the respective detecting image.

There may be multiple comparison reference feature vectors: one with an empty background, one with only one bird, one with a predetermined number of birds, one with one or more birds distributed in the observation space, one with one or more birds concentrated in a predetermined zone of the observation space, etc.

In an example embodiment of the method illustrated in FIG. 2, in the image capturing step 101 an image is captured.

The image is first processed in such a way as to obtain a feature vector that represents in numeric format the features of the image captured.

From the feature vector corresponding to the image captured a reference feature vector is obtained.

That reference feature vector is compared with a comparison reference feature vector, which may correspond for example to the image of the "empty" field of view or to the same image in which one or more birds appear.

Based on the comparison, a first data item dri1 is identified, for indicating the presence or absence of one or more birds.

This data item dri1 is sent to the processing unit.

After the operational detecting phase, in which the presence of one or more birds is ascertained, the method involves a tracking phase.

That operational tracking phase occurs in a second time interval comprising a series of tracking instants situated one after the other in time.

The tracking instants may be distant from each other in time.

Preferably, a time interval is set in which the observation space is monitored in successive instants.

The operational tracking phase, for each tracking instant, comprises a respective operational tracking sequence. Each respective operational tracking sequence may be considered associated with a respective tracking instant.

FIG. 4 shows the monitoring system 1 during a respective operational tracking sequence associated with a respective tracking instant.

FIG. 5 is a flow chart describing a respective operational tracking sequence associated with a respective tracking instant.

Each respective operational tracking sequence comprises a respective tracking step. The respective tracking step is indicated by block 201 in FIG. 5. In the respective tracking step 201 of the respective operational tracking sequence, an acquisition unit A captures at least one respective tracking image of the observation space. A respective tracking image captured by the acquisition unit A during a respective tracking step is indicated by the arrow IS of FIG. 4.

As in the detecting sequence, in the tracking sequence too, there is a step of capturing an image in the observation space.

If, in order to perform the monitoring method according to the third aspect of this description, use is made of the first variant of the monitoring system 1 according to the first aspect, the respective capturing step 201 of the respective operational tracking sequence is performed by means of the above-mentioned first acquisition device.

If, in order to perform the monitoring method according to the third aspect of this description, use is made of the second variant of the monitoring system 1 according to the first aspect, the respective capturing step 201 of the respective operational tracking sequence is performed by means of the above-mentioned second acquisition device.

Each respective operational tracking sequence comprises a respective processing step. The respective processing step is indicated by block 202 in FIG. 5. In the respective processing step 202, the processing unit E processes at least one respective tracking image IS captured by the acquisition unit A. The respective tracking image IS relates to the respective tracking instant associated with the respective operational tracking sequence.

In the respective processing step 202, the processing unit E processes at least one respective feature vector correlated with the respective tracking image IS. The respective feature vector correlated with the respective tracking image IS is indicated by the arrow SIS in FIG. 4.

Each respective operational tracking sequence comprises, before the respective processing step 202, a respective sending step in which the acquisition unit A sends, to the processing unit E, the respective feature vector SIS correlated with the respective tracking image IS.

Each respective operational tracking sequence comprises, before the respective processing step 202, a receiving step in which the processing unit E receives, from the acquisition unit A, the respective feature vector SIS correlated with the respective tracking image IS.

As was the case for detecting, for tracking too, from the capturing step a feature vector is obtained which corresponds to the image or the portion of image captured at the tracking instant. That feature vector is sent to and received by the processing unit E, in which it is further processed.

Each respective operational tracking sequence preferably comprises a respective deriving step. The respective deriving step is indicated by block 203 in FIG. 5.

The respective deriving step is performed as a function of and/or depending on the respective processing step 202.

In that deriving step, the processing unit E preferably derives at least one respective kinematic data item.

In FIG. 5, that respective kinematic data item is shown by any of the arrows labelled "dcin", and exits the block relative to the respective deriving step 203, since it is derived during the respective deriving step 203.

The at least one respective kinematic data item indicates, in the respective tracking instant to which the respective tracking image IS refers, at least one kinematic quantity of the bird detected.

That at least one kinematic quantity may comprise, for example, a speed, relative to said observation space, of the bird detected.

That at least one kinematic quantity may comprise, for example, a positioning, relative to said observation space, of the bird detected.

By means of at least that respective kinematic data item, the processing unit E can predict the flight trajectory that will be followed by the bird detected, starting from the respective tracking instant to which the respective tracking image IS refers.

During the deriving step 203, the processing unit E could derive a respective plurality of kinematic data, each data item associated with a corresponding bird detected of the plurality of birds detected. In this way, the processing unit E can predict the corresponding flight trajectories that will be followed by the birds of the plurality of birds detected, starting from the respective tracking instant to which the respective tracking image IS refers.

During the deriving step 203, the processing unit E processes the feature vector corresponding to the image captured in the tracking instant, for obtaining one or more kinematic quantities of one or more birds that are present in the image.

In that deriving step, the processing unit E preferably derives at least one respective recognition data item.

In FIG. 5, that respective recognition data item is shown by the arrow labelled "dsp", and exits the block relative to the respective deriving step 203, since it is derived during the respective deriving step 203.

The respective recognition data item "dsp" indicates, in the respective tracking instant to which the respective tracking image IS refers, the species to which the bird detected belongs.

During the deriving step, the processing unit E could derive a respective plurality of recognition data, each data item associated with a corresponding bird detected of the plurality of birds detected.

In that deriving step 203, the processing unit E preferably derives at least one respective concentration data item.

Therefore, during the deriving step the processing unit E may obtain the species of birds present in the image.

In FIG. 5, the respective concentration data item is shown by the arrow labelled "dcon", and exits the block relative to the respective deriving step 203, since it is derived during the respective deriving step 203.

If the detecting data item "dril" indicates the presence of a plurality of birds in the observation space, the concentration data item "dcon" indicates the number of birds of the plurality of birds detected.

During the deriving step the processing unit E can ascertain the concentration of birds present in the image.

The respective processing step 202 may comprise at least one respective analysis step for analysis of the respective tracking image IS.

The respective processing step 202 comprises at least one respective calculating step. In the respective calculating step of the respective processing step 202, the processing unit E calculates at least one respective reference vector correlated with the respective tracking image IS.

As in the detecting step, in the tracking step too, a reference feature vector is calculated starting from the feature vector of the image captured in the tracking instant.

The respective processing step 202 preferably comprises at least one respective comparing step. In the respective comparing step of the respective processing step 202, the processing unit E compares the respective reference vector correlated with the respective tracking image IS with:
- a reference vector correlated with a previous tracking image captured before the respective tracking image IS, and/or
- a plurality of reference vectors correlated with respective previous tracking images captured before the respective tracking image IS; and/or
- information data stored or pre-set in the processing unit and relating to physical characteristics and/or to the typical movements of a plurality of species of birds. The information data may, for example, relate to typical shapes and/or sizes and/or frequencies of wing beat and/or colours of the plurality of species of birds.

The processing unit may therefore compare the new reference feature vector obtained starting from the new image captured in the tracking instant with one or more reference feature vectors obtained from images previously captured.

Advantageously, the processing unit can compare the new reference feature vector obtained from the new image captured in the tracking instant with data already stored or pre-set in the processing unit.

This comparison allows the application of ontologies which are pre-set in the processing unit, integrating the recognition based only on statistical methods.

The pre-set ontologies may comprise a priori knowledge of information about the avifauna and about the territory and allow the inclusion of a "reasoning" step useful for increasing the precision of classification of the species.

The ontology integrates the neural networks both as input, and as a filter on the output of the neural networks. As input, consider for example the period of the year, the migratory habits of the various species and other known information for the classification of birds. Once a statistical result has been obtained from the processing of the vectors corresponding to the images captured, the ontology allows a check to ensure that there are no formal inconsistencies in the information that allow to exclude certain results.

For example, if from the processing of the feature vectors it is established that a bird has a wingspan of 80 cm, flies at a predetermined speed, in a flock of 10 birds, and is red in colour, the neural network classes the bird as "seagull" because 3 of the 4 pieces of information are typical of seagulls, but the ontology intervenes with the information that the seagull is not red in colour, and therefore the bird cannot be classed as "seagull".

Each respective operational tracking sequence comprises a respective controlling step for controlling said acquisition unit. The respective controlling step is indicated by block 204a in FIG. 5. In that respective controlling step 204a for controlling the acquisition unit A, the processing unit E controls the acquisition unit A as a function at least of said respective kinematic data item "dcin" and/or at least of said respective recognition data item "dsp" and/or as a function at least of said respective concentration data item "dcon" and/or as a function of said plurality of kinematic data and/or as a function of said plurality of recognition data.

The respective controlling step 204a therefore occurs as a function of the respective deriving step 203.

The respective controlling step 204a is performed in such a way that, by means of the movement of the at least one acquisition device, the images captured by said acquisition unit A after said respective tracking instant are captured tracking the movement of said bird detected relative to the observation space or the movements of the plurality of birds detected relative to the observation space.

In that controlling step 204a, the processing unit E preferably controls a movement system.

The respective controlling step preferably comprises a respective movement step. In the respective movement step, the movement system generates a movement, relative to the observation space, of at least one acquisition device of the acquisition unit A.

That movement in turn causes a corresponding movement, relative to the observation space, of at least one field of view defined by the at least one acquisition device, and therefore a corresponding variation of the field of view of the images captured by the at least one acquisition device.

The respective movement step is performed in such a way that, by means of the movement of the at least one acquisition device, the images captured by said acquisition unit after said respective tracking instant are captured tracking the movement of said bird detected relative to the observation space or the movements of the plurality of birds detected relative to the observation space.

If, in order to perform the monitoring method according to the third aspect of this description, use is made of the first variant of the monitoring system according to the first aspect of this description, the at least one acquisition device, which is moved during the movement step, is the above-mentioned first acquisition device.

If, in order to perform the monitoring method according to the third aspect of this description, use is made of the second variant of the monitoring system according to the first aspect of this description, the at least one acquisition device, which is moved during the movement step, is the above-mentioned second acquisition device.

By means of the respective controlling step 204a, it is therefore possible to obtain tracking of the bird detected or of the plurality of birds detected by the tracking images captured by the acquisition unit A. Considering that the deriving step 203 may allow prediction of the respective flight trajectories of multiple birds, excellent precision is obtained in the tracking of those birds by the tracking images during the operational tracking phase, in such a way as to also increase the precision of the prediction of the trajectories, which occurs in each of the tracking instants, since that tracking is a function of the deriving step 203.

The respective controlling step 204a for controlling the acquisition unit A comprises a step of sending, by the processing unit E and to the acquisition unit A, of at least one control signal Z.

The respective controlling step 204a for controlling the acquisition unit A comprises a step of the acquisition unit A receiving the at least one control signal Z arriving from said processing unit E.

In FIG. 4 the control signal Z is indicated as a function at least of the kinematic data item "dcin" and/or of the recognition data item "dsp" and/or of the concentration data item "dcon", since the controlling step 204a for controlling the acquisition unit A may occur as a function at least of the kinematic data item "dcin" and/or at least of the recognition data item "dsp" and/or at least of the concentration data item "dcon".

During the operational switching phase, the processing unit E switches the acquisition unit A in such a way that the monitoring system 1 changes from the operational detecting phase to the operational tracking phase.

The processing unit E may be programmed so that the switching phase is performed, in any of the detecting instants, if at least one respective detecting data item obtained during the respective obtaining step indicates the presence of at least one bird in the observation space or if it indicates the presence of a plurality of birds in the observation space.

The operational switching phase may therefore occur starting from and/or after each of the detecting instants, if at least one respective detecting data item obtained during the respective obtaining step indicates the presence of at least one bird in the observation space or if it indicates the presence of a plurality of birds in the observation space.

The switching step for switching the acquisition unit A preferably comprises a step of sending, by the processing unit E and to the acquisition unit A, of at least one switching signal W.

The switching step for switching the acquisition unit A preferably comprises a step of the acquisition unit A receiving the at least one switching signal W arriving from the processing unit E.

Each respective operational tracking sequence may comprise a respective command step for issuing commands to the bird dispersal unit B. The respective command step is indicated by the block 204b in FIG. 5. In the respective command step, the processing unit E issues commands to the dispersal unit B as a function at least of said respective kinematic data item "dcin" and/or at least of said respective recognition data item "dsp" and/or as a function at least of said respective concentration data item "dcon" and/or as a function of said plurality of kinematic data and/or as a function of said plurality of recognition data.

The respective command step 204b therefore occurs as a function of the respective deriving step 203.

The respective command step 204b is performed in such a way in that said dispersal unit B disperses and/or drives away from said observation space the bird detected or the plurality of birds detected, based on at least said respective kinematic data item "dcin" and/or based on at least said respective recognition data item "dsp" ad/or based on at least said respective concentration data item "dcon" and/or based on at least said plurality of kinematic data and/or based on at least said plurality of recognition data.

Considering that the deriving step 203 may allow prediction of the respective flight trajectories of multiple respective birds detected and the species of those birds, excellent precision is obtained in the dispersal of a flock of birds, if present, by the dispersal unit B, since that dispersal is a function of the deriving step 203.

The respective command step 204b comprises a step of sending, by the processing unit E and to the dispersal unit B, of at least one command signal U.

The command step comprises a step of the dispersal unit B receiving the at least one command signal U arriving from said processing unit E.

In FIG. 4 the command signal U is indicated as a function at least of the kinematic data item "dcin" and/or of the recognition data item "dsp" and/or of the concentration data item "dcon", since the command step 204b for issuing commands to the dispersal unit B may occur as a function at least of the kinematic data item "dcin" and/or at least of the recognition data item "dsp" and/or at least of the concentration data item "dcon".

In FIG. 5 there are two arrows labelled "dcin", which exit the block relative to the deriving step 203, and which respectively lead to a block 204a relative to the respective controlling step for controlling the acquisition unit A and to a block 204b relative to the respective command step for issuing commands to the dispersal unit B, since both the controlling step 204a and the command step 204b may be a function of the respective kinematic data item "dcin".

In FIG. 5 there are two arrows labelled "dsp", which exit the block relative to the deriving step 203, and which respectively lead to a block 204a relative to the respective controlling step for controlling the acquisition unit A and to a block 204b relative to the respective command step for issuing commands to the dispersal unit B, since both the controlling step 204a and the command step 204b may be a function of the respective recognition data item "dsp".

In FIG. 5 there are two arrows labelled "dcon", which exit the block relative to the deriving step 203, and which respectively lead to a block 204a relative to the respective controlling step for controlling the acquisition unit A and to a block 204b relative to the respective command step for issuing commands to the dispersal unit B, since both the controlling step 204a and the command step 204b may be a function of the respective concentration data item "dcon".

A detecting system according to this description also allows the self-same detecting system to increase its performance in terms of precision in detecting the presence of birds, the number of birds present, their species, and in predicting their flight trajectories, thanks to the possibility of self-learning by the detecting system.

The invention claimed is:

1. A system for automatic monitoring of a presence of at least one bird in an observation space, comprising:
    an image acquisition unit and a processing unit,
    wherein said image acquisition unit is configured to capture, in respective detecting instants, a respective detecting image of said observation space,
    wherein said processing unit is programmed to process the respective detecting image in such a way as to obtain a respective detecting data item relating to the respective detecting image,
    the respective detecting data item indicating either a presence or an absence, in a respective detecting instant to which the respective detecting image relates, of the at least one bird situated in said observation space,
    wherein said processing unit is programmed, to obtain the respective detecting data image, for calculating a respective reference vector representing the respective detecting image, the respective reference vector being a data vector that for each portion of the respective detecting image, comprises at least one value of a descriptor in the corresponding portion of the respective detecting image;

wherein said processing unit is programmed, in order to obtain the respective detecting data item, for comparing the respective reference vector with a comparison reference vector;

wherein the comparison reference vector is pre-set and stored in the processing unit;

wherein the comparison reference vector represents a pre-set image;

wherein the pre-set image shoes the at least one bird in a part of the observation space which falls within the field of view of the respective detecting image.

2. The monitoring system according to claim 1, wherein said processing unit is programmed for switching said image acquisition unit in such a way that, if the respective detecting data item indicates the presence of the at least one bird in the observation space, said image acquisition unit changes from the acquisition of said respective detecting image to the acquisition, in respective tracking instants after said detecting instants, of a sequence of respective tracking images of the at least one bird, said respective tracking images being images at the detected at least one bird;

wherein said processing unit is programmed for processing the respective tracking images, in such a way as to derive at least one respective kinematic data item indicating, in respective tracking instants to which said respective tracking images refer, at least one kinematic quantity of the at least one bird, wherein said at least one respective kinematic data item comprises at least one chosen from a speed and a positioning of the at least one bird relative to said observation space;

wherein said processing unit is programmed for controlling said image acquisition unit as a function of said at least one respective kinematic data item, in such a way that the images captured by said image acquisition unit after said respective tracking instants represent the at least one kinematic quantity of the at least one bird relative to the observation space.

3. The monitoring system according to claim 2, wherein said processing unit is programmed for processing the respective tracking images, in such a way as to derive a respective recognition data item indicating the species to which the at least one bird belongs.

4. The monitoring system according to claim 3, wherein the respective detecting data item indicates a presence of a plurality of birds in said observation space, and wherein said processing unit is programmed for processing the respective tracking images in such a way as to derive a respective concentration data item indicating a number of birds of the plurality of birds.

5. The monitoring system according to claim 4, wherein said processing unit is programmed, in order to derive at least one chosen from the respective kinematic data item, the respective recognition data item and the respective concentration data item, for calculating a further respective reference vector representing the respective tracking image;

wherein said processing unit is programmed, in order to derive the at least one chosen from the respective kinematic data item, the respective recognition data item and the respective concentration data item, for comparing the further respective reference vector with a yet further reference vector representing a previous tracking image captured before the respective tracking image;

wherein said processing unit is programmed, in order to derive the at least one chosen from the respective kinematic data item, the respective recognition data item and the respective concentration data item, for comparing the further respective reference vector with a plurality of reference vectors representing respective previous tracking images captured before the respective tracking image;

wherein said processing unit is programmed, in order to derive the at least one chosen from the respective kinematic data item, the respective recognition data item and the respective concentration data item, for comparing the further respective reference vector with information data stored or pre-set in the processing unit and relating to at least one chosen from physical characteristics and typical movements of a plurality of species of birds; the information data relating to at least one chosen from typical shapes of birds, sizes of birds, frequencies of wing beats and colors of birds.

6. A method for automatic monitoring of a presence of at least one bird in an observation space, comprising:

an operational detecting phase which occurs in a first time interval comprising a series of detecting instants situated one after another in time;

wherein said operational detecting phase, for each detecting instant, comprises a respective operational detecting sequence, each respective operational detecting sequence being associated with a respective detecting instant;

wherein each respective operational detecting sequence comprises:

a respective image capturing step, where an image acquisition unit captures a respective detecting image of said observation space;

a first respective processing step using a processing unit for processing the respective detecting image;

a respective obtaining step, wherein the processing unit obtains a respective detecting data item relating to the respective detecting image, the respective obtaining step being performed as at least one chosen from a function of and depending on the first respective processing step;

the respective detecting data item indicating either a presence or an absence, in said respective detecting instant to which the respective detecting image relates, of the at least one bird situated in said observation space, wherein the first respective processing step comprises a first respective calculating step, in which the processing unit calculates a respective reference vector representing the respective detecting image, the respective reference vector being a data vector that for each portion of the respective detecting image, comprises a value of a descriptor in a corresponding portion of the respective detecting image;

wherein the first respective processing step comprises a first respective comparing step, in which the processing unit compares the respective reference vector with a comparison reference vector;

wherein the comparison reference vector is pre-set and stored in the processing unit;

wherein the comparison reference vector represents an image which shows the at least one bird in a part of the observation space which falls within a field of view of the respective detecting image.

7. The monitoring method according to claim 6, comprising:
an operational tracking phase which occurs in a second time interval comprising a series of tracking instants situated one after the other in time;
an intermediate switching phase between said operational detecting and tracking phases;
wherein, in said switching phase, the processing unit switches the image acquisition unit in such a way that, if the respective detecting data item indicates the presence of the at least one bird in the respective in said respective detecting instant, and then the presence of a flock detected, the operational tracking phase starts;
wherein the operational switching phase therefore occurs after each of the detecting instants, if the respective detecting data item indicates the presence of the at least one bird in the observation space;
wherein said operational tracking phase, for each tracking instant, comprises a respective operational tracking sequence, each respective operational tracking sequence being associated with a respective tracking instant;
wherein each respective operational tracking sequence comprises:
a respective tracking step, where an image acquisition unit captures a respective tracking image of the at least one bird, wherein the respective tracking image is an image of the at least one bird detected;
a second respective processing step, wherein the processing unit processes the respective tracking image;
a respective deriving step, the respective deriving step being performed as at least one chosen from a function of and depending on the second respective processing step.

8. The monitoring method according to claim 7,
wherein, in the respective deriving step, the processing unit derives at least one respective kinematic data item,
wherein the at least one respective kinematic data item indicates, in the respective tracking instant to which the respective tracking image refers, at least one kinematic quantity of the at least one bird; the at least one kinematic quantity comprising at least one chosen from a speed and a positioning of the at least one bird relative to said observation space.

9. The monitoring method according to claim 8,
wherein, in the respective deriving step, the processing unit derives at least one respective recognition data item;
wherein the at least one respective recognition data item indicates, in the respective tracking instant to which the respective tracking image refers, a species to which the at least one bird belongs.

10. The monitoring method according to claim 9,
wherein the respective detecting data item indicates the presence of a plurality of birds in said observation space, wherein, in the respective deriving step, the processing unit derives at least one respective concentration data item;
wherein the at least one respective concentration data item indicates, in the respective tracking instant to which the respective tracking image refers, a number of birds of the plurality of birds.

11. The monitoring method according to claim 10,
wherein each respective operational tracking sequence comprises a respective controlling step, wherein, in the respective controlling step, the processing unit controls said image acquisition unit as a function of at least one chosen from the respective kinematic data item, the respective recognition data item and the respective concentration data item;
wherein the respective controlling step is performed in such a way that the images captured by said image acquisition unit after said respective tracking instant are captured represent the at least one kinematic quantity of the at least one bird relative to the observation space.

12. The monitoring method according to claim 7, wherein the second respective processing step comprises:
a second respective calculating step, wherein the processing unit calculates a further respective reference vector representing the respective tracking image;
a second respective comparing step, wherein the processing unit compares the further respective reference vector with at least one chosen from:
a reference vector representing a previous tracking image captured before the respective tracking image,
a plurality of reference vectors representing previous tracking images captured before the respective tracking image; and
information data stored or pre-set in the processing unit and relating to at least one chosen from physical characteristics and typical movements of a plurality of species of birds, the information data relating to at least one chosen from typical shapes of birds sizes of birds, frequencies of wing beats and colors of birds.

13. The monitoring method according to claim 6, wherein at least one chosen from the first respective processing step and the deriving step comprises statistical processing of feature vectors via at least one neural network.

14. The monitoring method according to claim 6, wherein at least one chosen from the first respective processing step and the deriving step comprises comparing feature vectors of pre-set ontology stored in said processing unit, wherein the pre-set ontology defines basic classification criteria.

15. The monitoring method according to claim 6, wherein the respective detecting data item is obtained by processing a feature vector representing the respective detecting image.

16. The monitoring method according to claim 6, wherein the respective detecting image is an image of a predetermined zone of said observation space.

17. The monitoring method according to claim 6, wherein the respective detecting data item is a Boolean type data item corresponding to the presence or to the absence of the at least one bird situated in said observation space.

18. The monitoring method according to claim 6, wherein said processing unit calculates said reference vector correlated with at least one chosen from the respective detecting image and the respective tracking image by processing a feature vector representing the at least one chosen from the respective detecting image and the respective tracking image.

19. The monitoring method according to claim 18, wherein said feature vector comprises, for each portion of the at least one chosen from the respective detecting image and the respective tracking image, at least one feature representative of the value of at least one physical quantity in the each portion.

20. The monitoring method according to claim 18, wherein said feature vector is an n-dimensional vector of numeric values which represent the at least one chosen from the respective detecting image and the respectivede tracking image or a portion of the at least one chosen from the respective detecting image and the respective tracking image.

21. The monitoring method according to claim 6, wherein said reference vector is a data vector, which, for each portion of the at least one chosen from the respective detecting image and the respective tracking image, comprises at least one value of a descriptor in said portion of image.

22. The monitoring method according to claim 6, wherein said comparison reference vector is a reference vector representing a pre-set image, said comparison reference vector being a data vector which, for each portion of said pre-set image, comprises at least one value of a descriptor in said portion of pre-set image.

23. The monitoring method according to claim 6, wherein said comparison reference vector is an n-dimensional vector of numeric values which represent a pre-set image or a portion of pre-set image, said pre-set image or portion of pre-set image relating to a same part of the observation space that falls within the field of view of the respective detecting image.

* * * * *